UNITED STATES PATENT OFFICE.

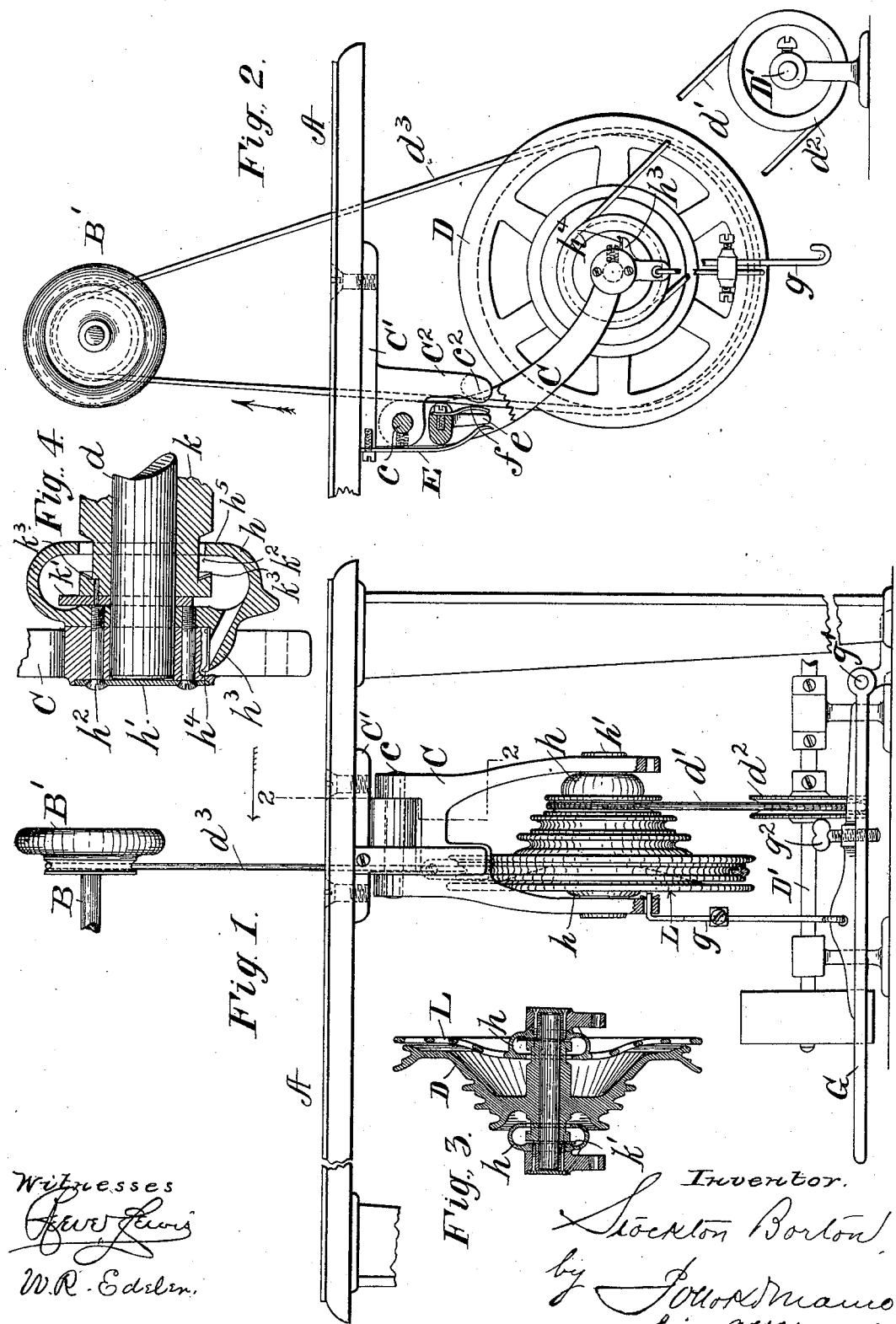

STOCKTON BORTON, OF BROOKLYN, NEW YORK, ASSIGNOR TO THE WILLCOX & GIBBS SEWING MACHINE COMPANY, OF NEW YORK, N. Y.

POWER-TRANSMITTER FOR SEWING-MACHINES.

SPECIFICATION forming part of Letters Patent No. 581,328, dated April 27, 1897.

Application filed July 18, 1896. Serial No. 599,723. (No model.)

*To all whom it may concern:*

Be it known that I, STOCKTON BORTON, of Brooklyn, New York, have invented new and useful Improvements in Power-Transmitters for Sewing-Machines, which are fully set forth in the following specification.

Sewing-machines when used in factories and driven by power are sometimes connected with the counter-shafts by belts through the usual fast and loose pulleys and are started and stopped by means of a belt-shipper. On account of the oil thrown by the loose pulley this is objected to, and other means of starting and stopping such machines are desired, and for this purpose devices operating like friction-clutches to connect and disconnect the sewing-machine shaft with the counter-shaft or driving-shaft have been employed.

The present invention has for its object to produce a simple and easily-operated mechanism whereby a sewing or other machine may be quickly connected with the driving-shaft and quickly disconnected therefrom and stopped and whereby the machine may be driven at any desired speed within the practical limits.

According to the present invention the machine receives its motion from a wheel or pulley turning loosely on its shaft, the latter being carried by a swinging arm or frame. From this loose wheel or pulley (which is beneath the work-table) a belt runs to the pulley on the sewing-machine shaft.

The loose pulley is connected by another belt with a pulley on the constantly-running counter-shaft and is itself in constant rotation. It is, however, normally kept out of operative contact with the belt of the sewing-machine by means of a spring or equivalent device acting upon the swinging frame. The latter is also provided with a connection to a treadle, so that when the operator presses upon the treadle with her foot the swinging frame is moved in the direction to bring its pulley into operative contact with the belt leading to the sewing-machine, thus instantly starting the latter. When the operator raises her foot, the swinging frame is moved by the spring or other device above mentioned into its non-operative position, this movement also causing the operation of a brake to arrest the movement of the sewing-machine.

The loose pulley, through which power is transmitted, is provided with special devices to prevent the escape of oil from its bearing and to protect the clothing of the operator from injury. The movement of the tilting frame is preferably in such direction that it relaxes the tension on the belt leading to the power-shaft at the same time that it releases its hold on the belt leading to the sewing-machine, though it need not move so far as to stop running. The advantage of this is that it saves wear on the belt by putting strain thereon only at the time when the machine is actually running.

By the arrangement described it is possible to drive the machine at any desired rate of speed up to the maximum, the speed being regulated by the pressure of the operator's foot. By a light pressure sufficient slip may be allowed to run the machine at a very low speed, and by increasing the pressure the slip is diminished and the rate of speed increased proportionately. Preferably an adjustable stop is provided whereby the movement of the swinging frame in the direction to tighten the belts may be limited, thus permitting any uniform rate of speed appropriate to the particular work in hand. This stop may conveniently be in the form of an adjustable screw set in the treadle, and whose end comes into contact with the floor when the treadle is pressed down to the desired limit.

In the accompanying drawings, which form part of this specification, Figure 1 is a front elevation of a power-transmitter constructed in accordance with the invention. Fig. 2 is a side elevation, partly in section, the section being on line 2 of Fig. 1. Fig. 3 is a vertical section through the axis of the pulley-shaft, and Fig. 4 is a sectional detail on a larger scale.

A represents a stand or table for supporting the sewing or other machine to be driven, of which the shaft B and driving-pulley B' are shown.

G represents a bifurcated frame pivoted at *c* to a bracket C', secured to the under side of the table A. In the branches of this frame is secured a spindle $d$, upon which is loosely mounted a pulley D, having a series of grooves of different diameters. Pulley D is driven by the driving-belt $d'$ from the pulley $d^2$ on the counter-shaft D', and it transmits motion by means of belt $d^3$ to pulley B'. A leaf-spring E, secured at one end to the bracket C', presses against a lug $e$ on frame C, tending to tilt said frame in a direction to slacken both the belts $d'$ and $d^3$. Bracket C' has an arm $C^2$, provided with a projection $c^2$, which acts as a stop to limit the movement of frame C when acted upon by spring E. The belt $d^3$ passes between lug $e$ and projection $c^2$, and consequently when spring E is free to act the belt will be gripped and the machine arrested. A comparatively light spring $f$ is interposed between lug $e$ and the belt in order to secure a yielding and gradually-increasing pressure upon the latter in stopping the machine.

The lower end of tilting frame C is connected by a link $g$ with a treadle G, pivoted at $g'$. In the normal position of the device the frame C is pressed forward by spring E, raising pulley D to such an extent that the belt $d^3$ is slack on said pulley, as seen in Fig. 2. Belt $d^3$, moreover, is clamped between the spring $f$ on lug $e$ and projection $c^2$, and shaft B is consequently stationary. To start the machine, the operator puts her foot on treadle G, swinging pulley D downward. This movement has for its first effect to release the belt $d^3$ and for its second to tighten both belts $d'$ and $d^3$ on their respective pulleys, thus starting the machine.

The downward movement of the treadle G is limited by a stop, shown as a set-screw $g^2$, engaging a threaded socket in the treadle, the end of this screw coming into contact with the floor when the treadle is depressed. This screw is adjustable, so that the movement of the treadle may be varied. Such adjustment is useful because the rate of speed at which it is desired to drive the machine will depend upon the character of the work in hand, and the speed may be regulated by the tightness of the driving-belts, allowing a greater or less amount of slip. Thus by turning screw $g^2$ up or down the rate of speed at which the machine will be driven when the treadle is depressed may be increased or diminished. Provision is thus made for instantly starting and stopping the machine and for driving it at the desired rate of speed within practical limits.

From the position of the loose pulley D it is of great importance to prevent the escape of oil from the bearings and to protect the clothing of the operator from being soiled or injured by the mechanism. To the inside of each of the arms of frame C is attached an oil-cup $h$. (Best shown in Fig. 4.) The hole in which the end of spindle $d$ is inserted extends through the frame C and is covered by a disk or cap $h'$, seated in a recess and held in place by screws $h^2$, whose ends extend into the cup $h$ and secure it to the frame. Plate $h'$ prevents the escape of oil that might spread along the spindle $d$. The construction is the same at both ends of the spindle $d$.

Cup $h$ is provided with an extension $h^3$ to one side of the end of frame C, in which extension is the oil-inlet, normally closed by a cap $h^4$, Figs. 2 and 4. The mouth of this inlet is slightly below the lowest level of the edge $h^5$ of the oil-cup, so that in filling the cup the oil will be seen at the inlet before it overflows the cup.

Pulley D has a long hub $k$, which projects at each end into one of the oil-cups. To each end is attached an eccentric disk $k'$, which acts as a spoon to dish up oil from the lower part of the cup, the oil running from the end of the spoon (when the latter is above the spindle) between it and the rear of the oil-cup, and thus finding its way to the spindle. In this manner the pulley will be kept constantly lubricated. Hub $k$ has a groove $k^2$, preferably undercut at one side to make an angle or oil-throwing flange $k^3$. The object of this is to prevent oil from working along the hub of the pulley and getting outside the oil-cup. Oil which may spread from spoon $k'$ to the right, Fig. 4, will, on reaching angle $k^3$, be thrown off by centrifugal force, if the pulley be in rotation, or, if stationary, will drop from this angle to the bottom of the cup.

On the side of pulley D toward the operator is a guard L in the form of a disk of about the same diameter as the pulley and cast in one piece with the oil-cup $h$. This guard prevents the clothing of the operator being caught by the pulley.

Having thus described my invention, what I claim as new, and desire to secure by Letters Patent, is—

1. A power-transmitter for sewing or other machines, comprising in combination a loose pulley adapted to be connected by belts with the driving-shaft and driven shaft respectively, a movable frame in which said pulley is mounted, means for moving said frame in the direction to tighten the driving-belt between said pulley and the driven shaft for the purpose of starting the machine, and means for normally pressing the frame in the opposite direction, thereby tightening said belt, substantially as described.

2. The combination with a driven shaft, and a constantly-rotating power-shaft, of an intermediate transmitter, comprising a pulley connected by belts with the two shafts respectively, a pivoted frame, a spring for normally holding said frame in position to slacken both said belts, and means, such as a treadle, for moving the frame in the opposite direction, thereby tightening said belts, substantially as described.

3. The combination with the driven and driving shafts, of a loose pulley connected by belts with said shafts respectively, a swinging frame in which said pulley is carried, a spring normally holding the frame in such position that the pulley is not in operative contact with the driving-belt, and means, operated by said spring, for gripping the belt, substantially as described.

4. The combination with the driven and driving shafts, of a pulley connected by belts with said shafts respectively, the movable frame carrying said pulley, a spring for throwing said frame, when free to act, into position to slacken the driving-belt, and gripping devices between which said belt moves, one of said devices being carried by said frame, substantially as described.

5. The combination with the driven and driving shafts, of a pulley connected by belts with said shafts respectively, the movable frame carrying said pulley, a spring for throwing said frame, when free to act, into position to slacken the driving-belt, and gripping devices between which said belt moves, one of said devices being carried by said frame and having an elastic or yielding surface for making contact with the belt, substantially as described.

6. The combination with a driven shaft, and a constantly-rotating power-shaft, of an intermediate transmitter, comprising a pulley connected by belts with the two shafts respectively, a pivoted frame, a spring for normally holding said frame in position to slacken said belts, a treadle for moving the frame in the opposite direction, and an adjustable stop for limiting the movement of the treadle, substantially as described.

7. In a power-transmitter for communicating motion to a sewing or other machine, the combination with a supporting-frame having a spindle, of a loose pulley on said spindle, an oil-cup surrounding said spindle and inclosing the end of the hub of said pulley, the latter being provided with an oil-throwing flange, and a device carried by the hub of said pulley for raising oil from the bottom of said cup, substantially as described.

8. In a power-transmitter for communicating motion to a sewing or other machine, the combination with a supporting-frame having a spindle, of a loose pulley on said spindle, an oil-cup surrounding said spindle, and inclosing the end of the hub of said pulley, the latter being provided with an oil-throwing flange, said oil-cup having a lateral extension containing an oil-inlet the mouth thereof being slightly below the level of the edge of said cup, substantially as described.

9. The combination with the bifurcated supporting-frame, of a spindle supported at its ends in the arms of said frame, an oil-cup on the inside of each of said arms fitting closely around said spindle, the shaft-holes in said arms being closed on the outside, and a loose pulley on said spindle, its hub at each end extending into one of said cups and having a groove on one side and an oil-raising device, substantially as described.

10. A power-transmitter for sewing-machines comprising a frame pivoted to the under side of the sewing-machine table, a loose pulley carried by said frame and connected by a belt with the sewing-machine shaft, means for moving the pulley in one direction to tighten said belt and in the other to slacken it, and a plate or guard carried by said frame adjacent to said pulley, substantially as described.

In testimony whereof I have signed this specification in the presence of two subscribing witnesses.

STOCKTON BORTON.

Witnesses:
J. PANNLY,
J. H. COOKE.